US012170163B2

(12) United States Patent
Okuzawa et al.

(10) Patent No.: US 12,170,163 B2
(45) Date of Patent: Dec. 17, 2024

(54) COIL COMPONENT AND MANUFACTURING METHOD THEREFOR

(71) Applicant: TDK Corporation, Tokyo (JP)

(72) Inventors: Nobuyuki Okuzawa, Tokyo (JP); Kazuhiko Ito, Tokyo (JP); Munehiro Takaku, Tokyo (JP); Junichiro Urabe, Tokyo (JP)

(73) Assignee: TDK Corporation, Tokyo (JP)

( * ) Notice: Subject to any disclaimer, the term of this patent is extended or adjusted under 35 U.S.C. 154(b) by 671 days.

(21) Appl. No.: 17/504,344

(22) Filed: Oct. 18, 2021

(65) Prior Publication Data

US 2022/0130596 A1 Apr. 28, 2022

(30) Foreign Application Priority Data

Oct. 23, 2020 (JP) ................................ 2020-177753

(51) Int. Cl.

*H01F 27/28* (2006.01)
*H01F 27/29* (2006.01)
(Continued)

(52) U.S. Cl.

CPC ....... *H01F 27/2823* (2013.01); *H01F 27/292* (2013.01); *H01F 27/327* (2013.01); *H01F 41/127* (2013.01)

(58) Field of Classification Search

CPC .. H01F 27/2823; H01F 27/292; H01F 27/327; H01F 41/127

See application file for complete search history.

(56) References Cited

U.S. PATENT DOCUMENTS 6,249,039 B1 * 6/2001 Harvey ............... H01F 17/0033 257/528
8,058,963 B2 * 11/2011 Yasuda ..................... H01F 3/12 336/212
(Continued)

FOREIGN PATENT DOCUMENTS

JP 05190334 A * 7/1993
JP H05190334 A 7/1993
(Continued)

OTHER PUBLICATIONS

Office Action issued in the corresponding Japanese patent Application No. 2020-177753 dated Jan. 30, 2024, w/ English Translation.

*Primary Examiner* — Malcolm Barnes
(74) *Attorney, Agent, or Firm* — Rimon P.C.

(57) ABSTRACT

Disclosed herein is a coil component that includes a coil pattern embedded in a resin body. The resin body includes a winding core area surrounded by the coil pattern and having a first surface and a substantially flat second surface different in the circumferential direction position from the first surface, and a first surrounding area covering the first surface of the winding core area. The coil pattern includes first sections extending along the first surface of the winding core area and second sections extending along the second surface of the winding core area. One ends of the first sections are connected respectively to their corresponding one ends of the second sections. The other ends of the first sections are connected respectively to their corresponding other ends of the second sections.

11 Claims, 11 Drawing Sheets

(51) Int. Cl.
*H01F 27/32* (2006.01)
*H01F 41/12* (2006.01)

(56) References Cited

U.S. PATENT DOCUMENTS

| | | | | |
|---|---|---|---|---|
| 2014/0191829 | A1* | 7/2014 | Chiba | H01F 5/00 29/602.1 |
| 2018/0096778 | A1* | 4/2018 | Yatabe | H01G 4/30 |

FOREIGN PATENT DOCUMENTS

| | | | |
|---|---|---|---|
| JP | 2006-324489 | A | 11/2006 |
| JP | 2008-198923 | A | 8/2008 |
| JP | 2017-103360 | A | 6/2017 |
| JP | 2018-61008 | A | 4/2018 |

* cited by examiner

COIL COMPONENT AND MANUFACTURING METHOD THEREFOR

BACKGROUND OF THE INVENTION

Field of the Invention

The present invention relates to a coil component and a manufacturing method therefor and, more particularly, to a coil component having a structure in which a helical coil pattern is embedded in a resin body and a manufacturing method therefor.

Description of Related Art

As a coil component having a structure in which a helical coil pattern is embedded in a resin body, a coil component described in JP 2006-324489A is known.

However, a coil pattern of the coil component described in JP 2006-324489A has many connection points, which may degrade the Q-factor.

SUMMARY

It is therefore an object of the present invention to reduce the number of connection points included in the coil pattern in a coil component having a structure in which a helical coil pattern is embedded in a resin body.

A coil component according to the present invention includes: a resin body; a coil pattern embedded in the resin body and helically wound in a plurality of turns; and first and second terminal electrodes provided on the surface of the resin body and connected respectively to one end and the other end of the coil pattern. The resin body includes a winding core area surrounded by the coil pattern and having a first surface and a substantially flat second surface different in the circumferential direction position from the first surface; and a first surrounding area covering the first surface of the winding core area. The coil pattern includes a plurality of first sections extending along the first surface of the winding core area and a plurality of second sections extending along the second surface of the winding core area. One ends of the plurality of first sections are connected respectively to their corresponding one ends of the plurality of second sections, and the other ends of the plurality of first sections are connected respectively to their corresponding other ends of the plurality of second sections.

According to the present invention, the coil pattern has two connection points per turn. Thus, the number of connection points included in the coil pattern is small, thus increasing reliability and Q-factor.

In the present invention, the first surface of the winding core area may have a curved surface in the circumferential direction. This increases reliability of the first sections of the coil pattern.

In the present invention, the winding core area and the first surrounding area may be made of mutually different resin-based insulating materials. This can achieve both characteristics required for the winding core area and characteristics required for the first surrounding area. In this case, the first surrounding area may be added with filler, and the winding core area may not be added with filler. Thus, it is possible to use an ultraviolet curable resin as the material of the winding core area while ensuring sufficient mechanical strength in the first surrounding area.

In the present invention, the resin body may further include a second surrounding area that covers the second surface of the winding core area so as to embed the plurality of second sections therein. The first and second terminal electrodes may be provided on the second surrounding area, and a resin-based insulating material constituting the second surrounding area may be lower in relative permittivity than the resin-based insulating material constituting the first surrounding area. This can reduce the floating capacitance generated between the first and second terminal electrodes and the coil pattern.

In the present invention, the resin body may further include a third surrounding area provided between the first surface of the winding core area and the first surrounding area so as to embed the plurality of first sections therein, and a resin-based insulating material constituting the third surrounding area may be lower in relative permittivity than the resin-based insulating material constituting the first surrounding area. This can reduce the floating capacitance generated between adjacent turns of the coil pattern.

In the present invention, the first and second terminal electrodes may be arranged along the axial direction of the coil pattern. This reduces the potential difference between the first and second terminal electrodes and the coil pattern, thereby further reducing floating capacitance.

In this case, the first and second terminal electrodes may be formed on the surface of the resin body parallel to the axial direction without being formed on the surface thereof perpendicular to the axial direction. This makes magnetic flux less likely to interfere with the first and second terminal electrodes, thereby suppressing the occurrence of an eddy current.

A coil component manufacturing method according to the present invention includes: a first step of forming, on a support body, a winding core area made of a resin-based insulating material; a second step of forming a plurality of first sections of a coil pattern along a first surface of the winding core area; a third step of covering the plurality of first sections and the first surface of the winding core area with a first surrounding area made of a resin-based insulating material; a fourth step of exposing a second surface of the winding core area and one end and the other end of each of the plurality of first sections by removing the support body; and a fifth step of forming a plurality of second sections of the coil pattern so as to connect one ends of the plurality of first sections and their corresponding other ends of the plurality of first sections.

According to the present invention, it is possible to easily manufacture a coil component having a reduced number of connection points.

The coil component manufacturing method according to the present invention may further include a sixth step of forming, on the second surface of the winding core area, a second peripheral area made of a resin-based insulating material so as to embed the plurality of second sections therein and a seventh step of forming, on the second surrounding area, first and second terminal electrodes connected respectively to one end and the other end of the coil pattern. The resin-based insulating material constituting the second surrounding area may be lower in relative permittivity than the resin-based insulating material constituting the first surrounding area. This can reduce the floating capacitance generated between the first and second terminal electrodes and the coil pattern.

The coil component manufacturing method according to the present invention may further include, after the second step and before the third step, a step of forming, on the first surface of the winding core area, a third surrounding area made of a resin-based insulating material so as to embed the plurality of first sections therein. The resin-based insulating material constituting the third surrounding area may be lower in relative permittivity than the resin-based insulating material constituting the first surrounding area. This can reduce the floating capacitance generated between adjacent turns of the coil pattern.

According to the present invention, it is possible to reduce the number of connection points included in the coil pattern in a coil component having a structure in which a helical coil pattern is embedded in a resin body.

BRIEF DESCRIPTION OF THE DRAWINGS

The above features and advantages of the present disclosure will be more apparent from the following description of certain preferred embodiments taken in conjunction with the accompanying drawings, in which:

FIG. 1A is a view as viewed from the top surface side, and FIG. 1B is a view as viewed from the mounting surface side;

FIGS. 5A to 11C are process views for explaining the manufacturing method for the coil component 1, where FIGS. 5A, 6A, 7A, 8A, 9A, 10A and 11A are schematic perspective views, FIGS. 5C, 6C, 7C, 8C, 9C, 10C, and 11C are schematic yz cross-sectional views;

DETAILED DESCRIPTION OF THE EMBODIMENTS

Preferred embodiments of the present disclosure will be explained below in detail with reference to the accompanying drawings.

First Embodiment

Figure 1A:
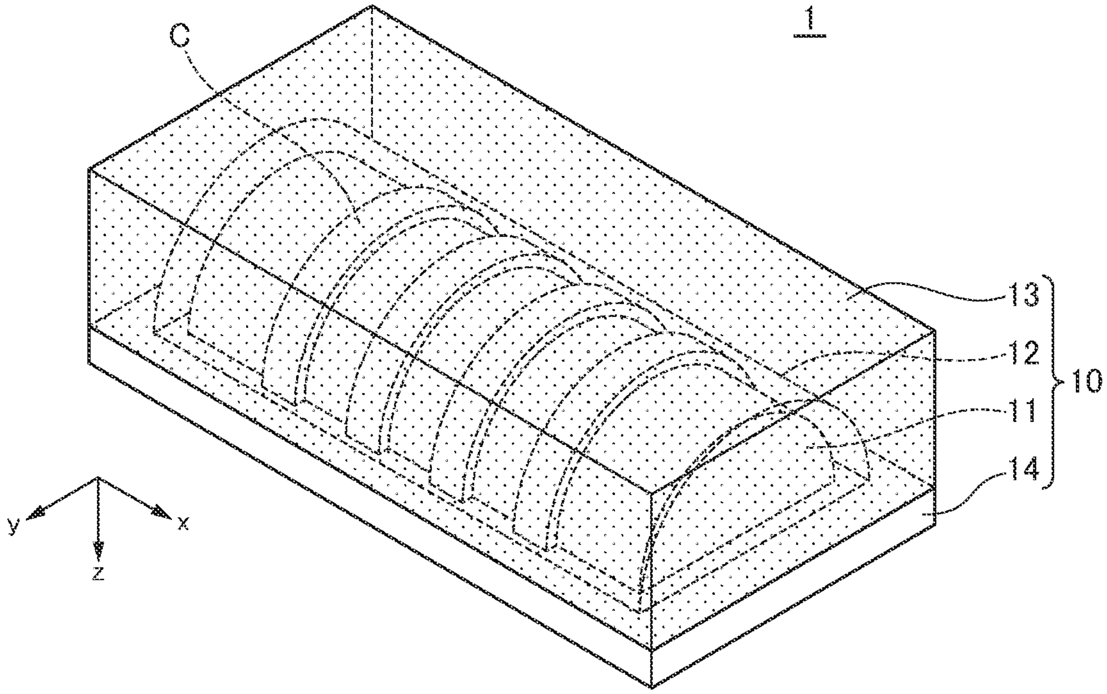
FIGS. 1A and 1B are schematic transparent perspective views for explaining the configuration of a coil component 1 according to a first embodiment of the present invention, where
Figure 1B:
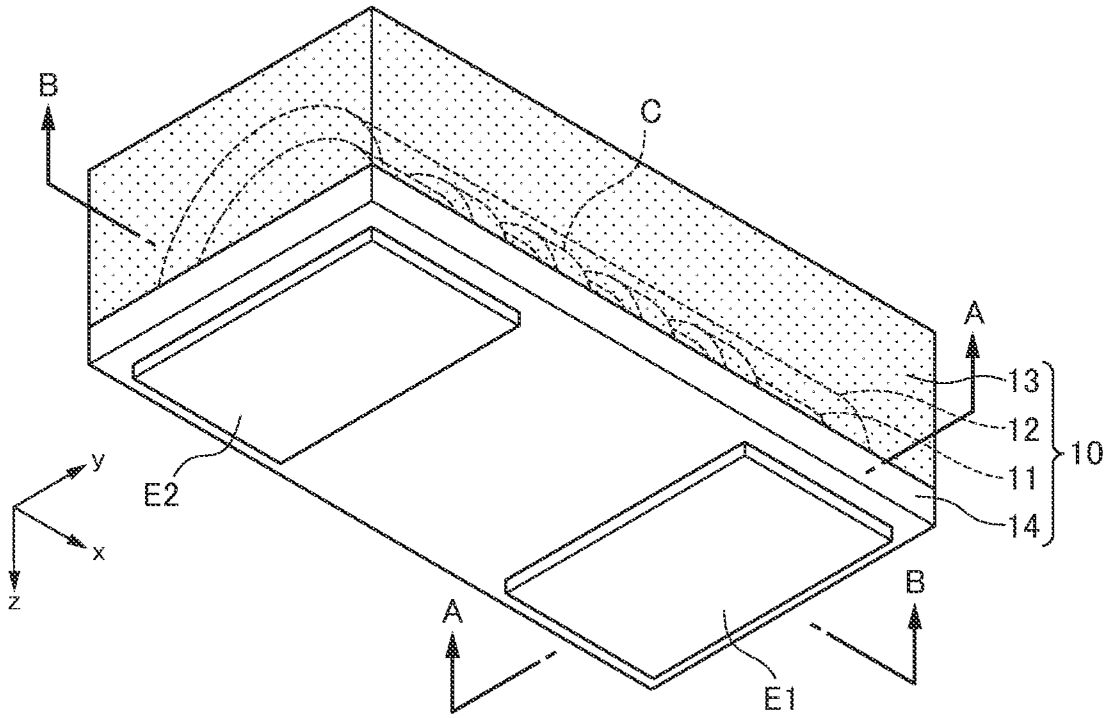
Figure 2A:
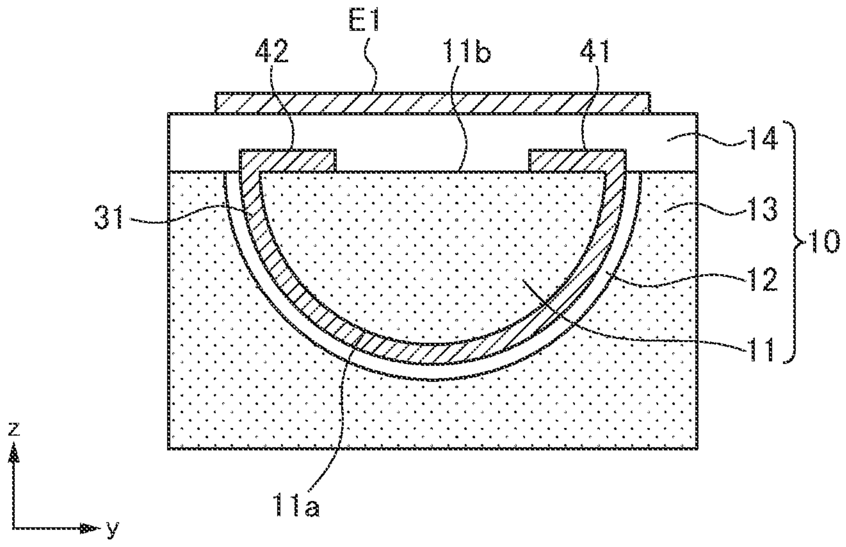
FIG. 2A is a schematic cross-sectional view taken along the line A-A in FIG. 1B.
Figure 2B:
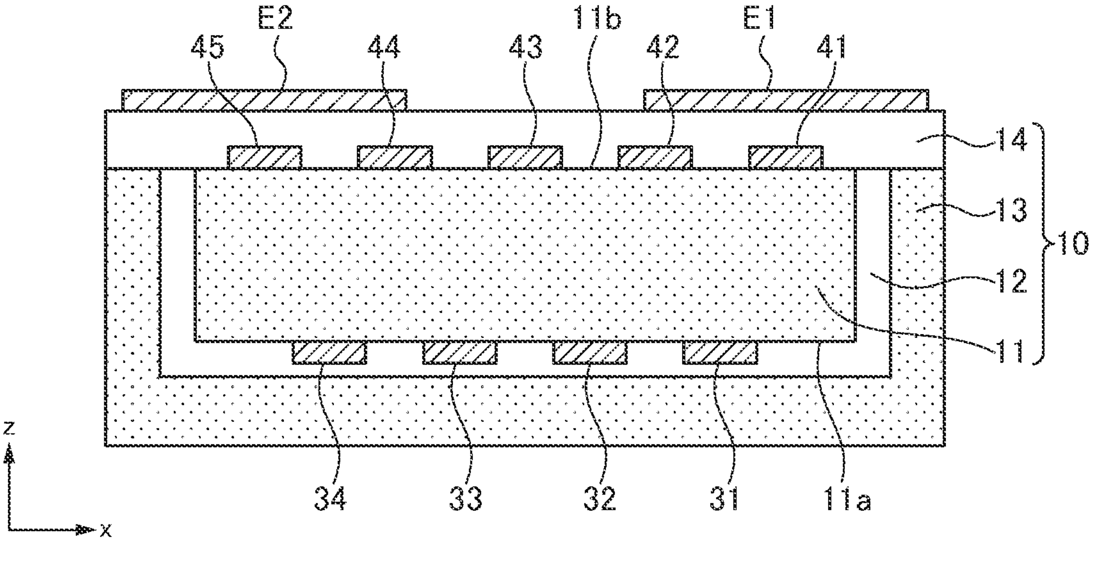
FIG. 2B is a schematic cross-sectional view taken along the line B-B in FIG. 1B.

FIGS. 1A and 1B are schematic transparent perspective views for explaining the configuration of a coil component 1 according to a first embodiment of the present invention. FIG. 1A is a view as viewed from the top surface side, and FIG. 1B is a view as viewed from the mounting surface side. FIG. 2A is a schematic cross-sectional view taken along the line A-A in FIG. 1B, and FIG. 2B is a schematic cross-sectional view taken along the line B-B in FIG. 1B.

The coil component 1 according to the first embodiment is a surface-mountable chip-type electronic component and includes, as illustrated in FIGS. 1A to 2B, a resin body 10, a coil pattern C embedded in the resin body 10, and terminal electrodes E1 and E2 provided on the surface of the resin body 10.

The resin body 10 includes a winding core area 11 and surrounding areas 12 to 14. The winding core area 11 is surrounded by the coil pattern C, and the surrounding areas 12 to 14 are positioned outside the coil pattern C. The winding core area 11 is made of a resin material not including filler, such as ultraviolet curable resin. The surrounding areas 12 and 14 are made of a resin material not including filler, such as bismaleimide or liquid crystal polymer. The resin-based insulating material constituting the surrounding area 12 and the resin-based insulating material constituting the surrounding area 14 may be the same as or different from each other. The surrounding area 13 is made of a resin-based insulating material obtained by adding filler such as silica to an epoxy- or acrylic-based resin material.

Thus, the resin-based insulating material constituting the surrounding area 13 is higher in strength and processability than that constituting the surrounding areas 12 and 14. On the other hand, the resin-based insulating material constituting the surrounding areas 12 and 14 is made of a resin material having a low relative permittivity and is added with no filler such as silica and is thus lower in relative permittivity than the resin-based insulating material constituting the surrounding area 13. For example, the resin-based insulating material constituting the surrounding area 13 has a relative permittivity E of about 3.3 at 1 GHz, and the resin-based insulating material constituting the surrounding areas 12 and 14 has a relative permittivity E of about 2.4 at 1 GHz.

The winding core area 11 has a first surface 11*a* having an arc shape in the yz cross section and a second surface 11*b* constituting the xy plane which is substantially flat, and the coil pattern C is wound on the first and second surfaces 11*a* and 11*b*. The yz cross section of the first surface 11*a* is not particularly limited but is preferably semicircular. With this configuration, the first surface 11*a* has no corner, facilitating the formation of the coil pattern C in a manufacturing process to be described later. Anyway, the first surface 11*a* constitutes a curved surface in the circumferential direction, and the second surface 11*b* is substantially flat, so that the first surface 11*a* has a larger area than the second surface 11*b*. Further, the first and second surfaces 11*a* and 11*b* are different in the circumferential direction, so that a conductor pattern constituting the coil pattern C is alternately disposed on the first and second surfaces 11*a* and 11*b*.

Figure 3:
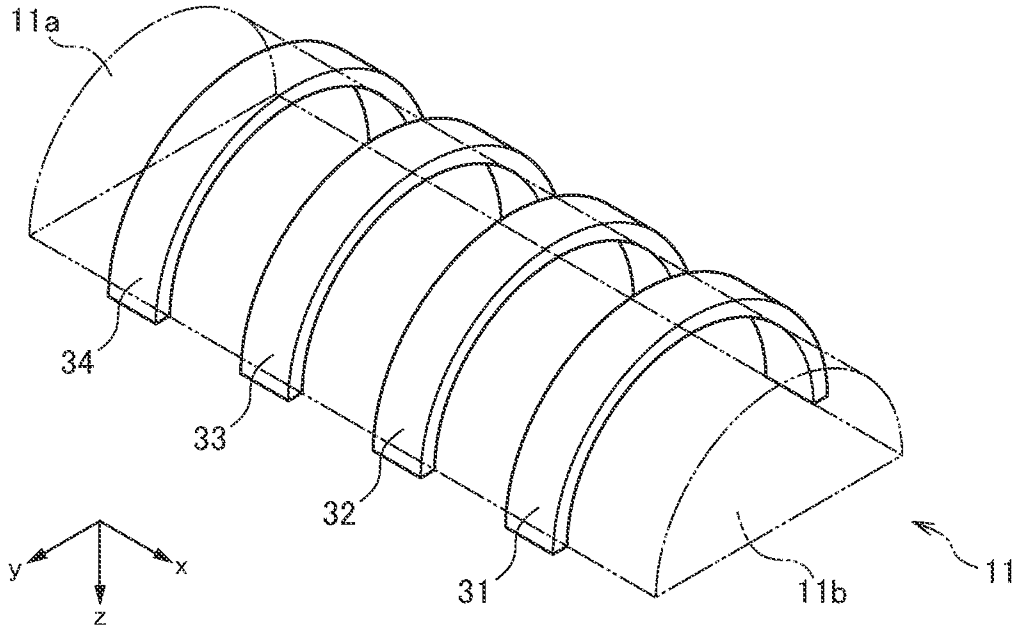
FIG. 3 is a schematic perspective view for explaining the structure of the coil pattern C embedded in the resin body 10.
Figure 4:
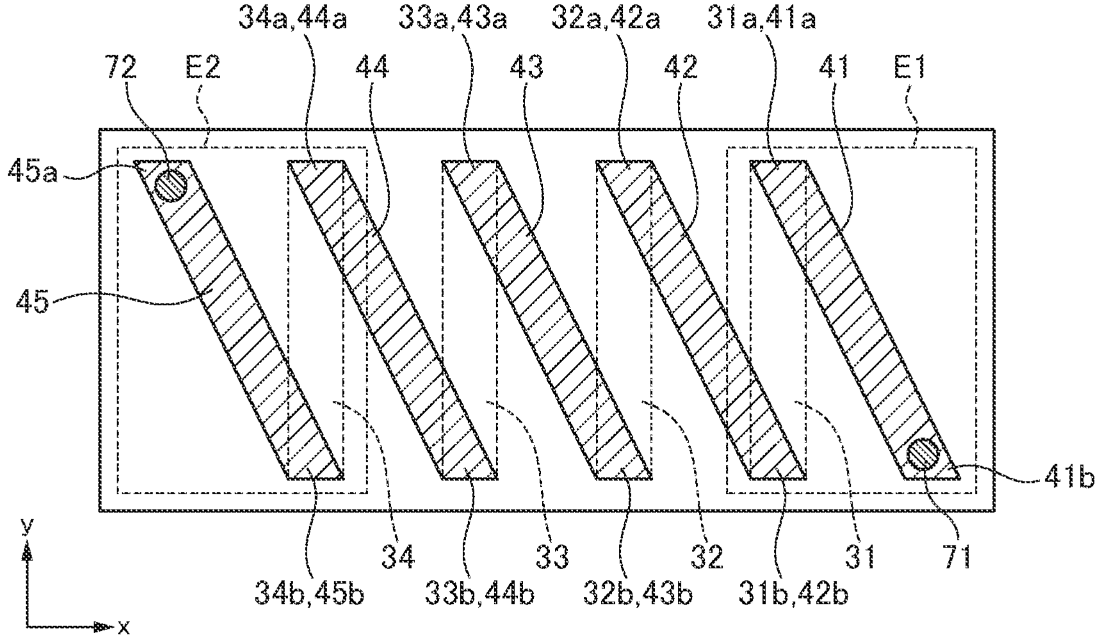
FIG. 4 is a schematic transparent plan view of the coil pattern C as viewed in the z-direction.

FIG. 3 is a schematic perspective view for explaining the structure of the coil pattern C embedded in the resin body 10. FIG. 4 is a schematic transparent plan view of the coil pattern C as viewed in the z-direction.

As illustrated in FIGS. 2A, 2B, 3 and 4, the coil pattern C is constituted of first sections 31 to 34 disposed on the first surface 11*a* of the winding core area 11 and second sections 41 to 45 disposed on the second surface 11*b* of the winding core area 11. As illustrated in FIGS. 2A and 2B, the first sections 31 to 34 are embedded in the surrounding area 12, and the second sections 41 to 45 are embedded in the surrounding area 14. One ends 31*a* to 34*a* of the first sections 31 to 34 are connected respectively to one ends 41*a* to 44*a* of the second sections 41 to 44, and the other ends 31*b* to 34*b* of the first sections 31 to 34 are connected respectively to the other ends 42*b* to 45*b* of the second sections 42 to 45.

With the above configuration, the coil pattern C helically wound in a plurality of turns is obtained. The coil pattern C has a coil axis extending in the x-direction. The other end

41*b* of the second section 41 constitutes one end of the coil pattern C and is connected to the terminal electrode E1 through a via conductor 71 penetrating the surrounding area 14. One end 45*a* of the second section 45 constitutes the other end of the coil pattern C and is connected to the terminal electrode E2 through a via conductor 72 penetrating the surrounding area 14. The terminal electrodes E1 and E2 are each a bottom-surface terminal formed only on the xy surface of the resin body 10. That is, the terminal electrodes E1 and E2 do not cover the yz surface of the resin body 10, so that when the coil component 1 is mounted on a circuit board using a solder, the yz surface of the resin body 10 is not covered with solder fillets. This improves the mounting density. Further, magnetic flux generated from the coil pattern C is less likely to interfere with the terminal electrodes E1, E2 and solder, making it possible to suppress the occurrence of an eddy current.

As illustrated in FIG. 4, the terminal electrode E1 overlaps at least the second section 41, and the terminal electrode E2 overlaps at least the second section 45. Thus, floating capacitance is generated between the terminal electrode E1 and the second section 41 and between the terminal electrode E2 and the second section 45. However, in the present embodiment, the surrounding area 14 positioned both therebetween is made of a resin-based insulating material having a low relative permittivity, making it possible to reduce the floating capacitance generated between the terminal electrode E1, E2 and the second sections 41 and 45. In addition, the second sections 41 to 45 are embedded in the surrounding area 14, so that the floating capacitance between the second sections 41 to 45 adjacent to one another in the x-direction, that is, the floating capacitance generated between adjacent turns of the coil pattern C can be reduced. This makes it possible to prevent self-resonance frequency (SRF) due to floating capacitance from lowering.

Further, in the present embodiment, the terminal electrode E1 also overlaps a part of the second section 42, and the terminal electrode E2 also overlaps a part of the second section 44. Thus, floating capacitance is also generated between the terminal electrode E1 and the second section 42 and between the terminal electrode E2 and the second section 44. The second section 42 has a longer wiring distance from the terminal electrode E1 than the second section 41, so that the floating capacitance between the terminal electrode E1 and second section 42 per unit area is larger than the floating capacitance of the terminal electrode E1 and the second section 41 per unit area due to the influence of a voltage drop. Similarly, the second section 44 has a longer wiring distance from the terminal electrode E2 than the second section 45, so that the floating capacitance between the terminal electrode E2 and the second section 44 per unit area is larger than the floating capacitance of the terminal electrode E2 and second section 45 per unit area due to the influence of a voltage drop. When the terminal electrodes E1 and E2 each thus overlap some of the second sections 41 to 45, the effect of the use of a resin-based insulating material having a low relative permittivity as the material of the surrounding area 14 becomes larger.

Further, in the present embodiment, the first sections 31 to 34 are embedded in the surrounding area 12, and the surrounding area 12 is made of a resin-based insulating material having a low relative permittivity, so that the floating capacitance between the first sections 31 to 34 adjacent to one another in the x-direction, that is, the floating capacitance generated between adjacent turns of the coil pattern C can be reduced.

On the other hand, the surrounding area 13 covering the first surface 11*a* of the winding core area 11 is made of a resin-based insulating material having high strength, so that sufficient mechanical strength of the entire resin body 10 can be ensured.

As described above, in the coil component 1 according to the present embodiment, the coil pattern C is wound in the winding core area 11, and the first sections 31 to 34 formed on the first surface 11*a* of the winding core area 11 and the second sections 41 to 45 formed on the second surface 11*b* of the winding core area 11 are connected respectively, so that the number of connection points included in the coil pattern C can be reduced. For example, in the present embodiment, the number of turns of the coil pattern C is four, and the number of connection points is eight. Thus, the number of connection points included in the coil pattern C is small, thus increasing reliability and Q-factor.

In addition, in the present embodiment, the coil pattern C includes portions covered with the surrounding areas 12 and 14 and a large part thereof is covered in the surrounding area 13 made of a resin-based insulating material having high strength, so that it is possible to prevent the lowering of the self-resonance frequency due to floating capacitance while ensuring the mechanical strength of the resin body 10.

Further, in the present embodiment, the terminal electrodes E1 and E2 are arranged in the axial direction (x-direction) of the coil pattern C, so that the terminal electrode E1 does not overlap the second sections (e.g., second sections 44 and 45) having a comparatively longer wiring distance therefrom and, similarly, the terminal electrode E2 does not overlap the second sections (e.g., second sections 41 and 42) having a comparatively longer wiring distance therefrom. This reduces the potential difference between the terminal electrodes E1, E2 and the second sections 41, 42, 44, and 45 overlapping the terminal electrodes E1, E2, so that it is possible to further reduce floating capacitance as compared with a case where the terminal electrodes E1 and E2 are arranged in the y-direction.

The following describes a manufacturing method for the coil component 1 according to the present embodiment.

FIGS. 5A to 11C are process views for explaining the manufacturing method for the coil component 1 according to the present embodiment. FIGS. 5A, 6A, 7A, 8A, 9A, 10A and 11A are schematic perspective views, FIGS. 5B, 6B, 7B, 8B, 9B, 10B, and 11B are schematic plan views, and FIGS. 5C, 6C, 7C, 8C, 9C, 10C, and 11C are schematic yz cross-sectional views.

Figure 5A:
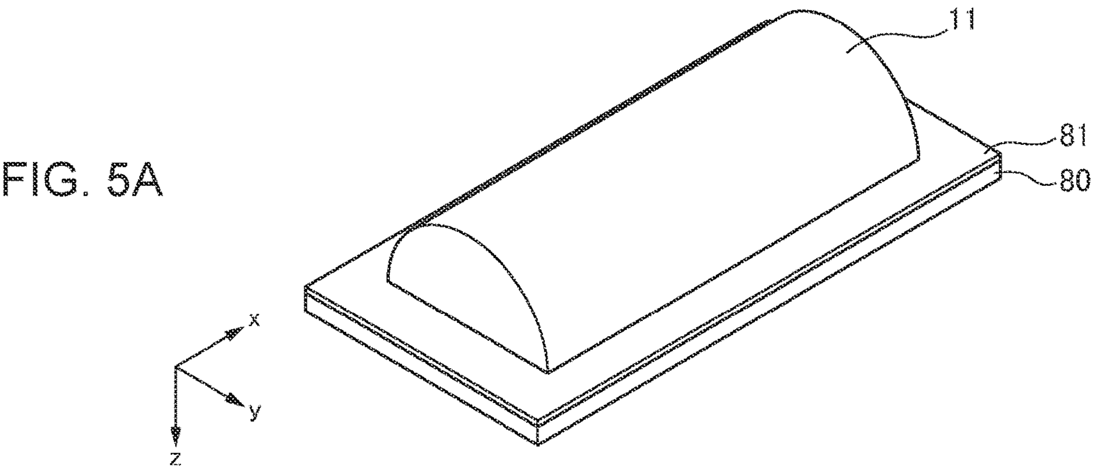
Figure 5B:
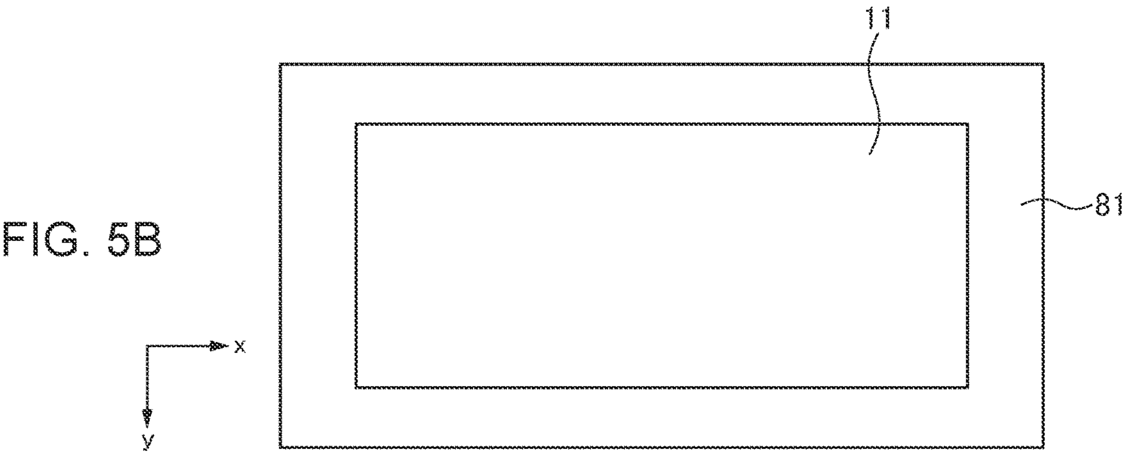
FIGS. 5B, 6B, 7B, 8B, 9B, 10B, and 11B are schematic plan views.
Figure 5C:
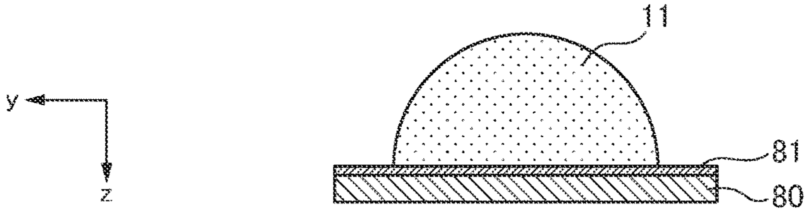

As illustrated in FIGS. 5A to 5C, a support substrate 80 made of silicon or quartz is prepared, and a sacrificial layer 81 is formed on the surface of the support substrate 80. The sacrificial layer 81 may be a laminated film of Cr and Cu, for example. Then, ultraviolet curable resin is applied onto the surface of the sacrificial layer 81, followed by exposure, to form the winding core area 11. At this time, uncured ultraviolet curable resin is applied not entirely but partially onto the sacrificial layer 81, the surface of the ultraviolet curable resin is shaped in an arc shape by surface tension. Thus, the surface (first surface 11*a*) of the winding core area 11 after curing of the ultraviolet curable resin is also shaped in an arc. The bottom surface (second surface 11*b*) of the winding core area 11 is positioned on the sacrificial layer 81 which is flat and is thus almost flattened.

Figure 6A:
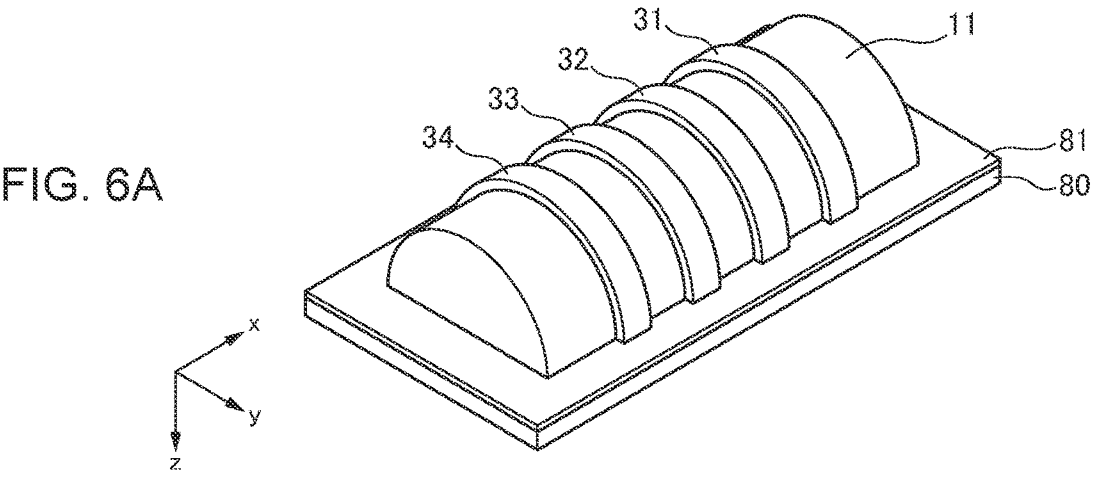
Figure 6B:
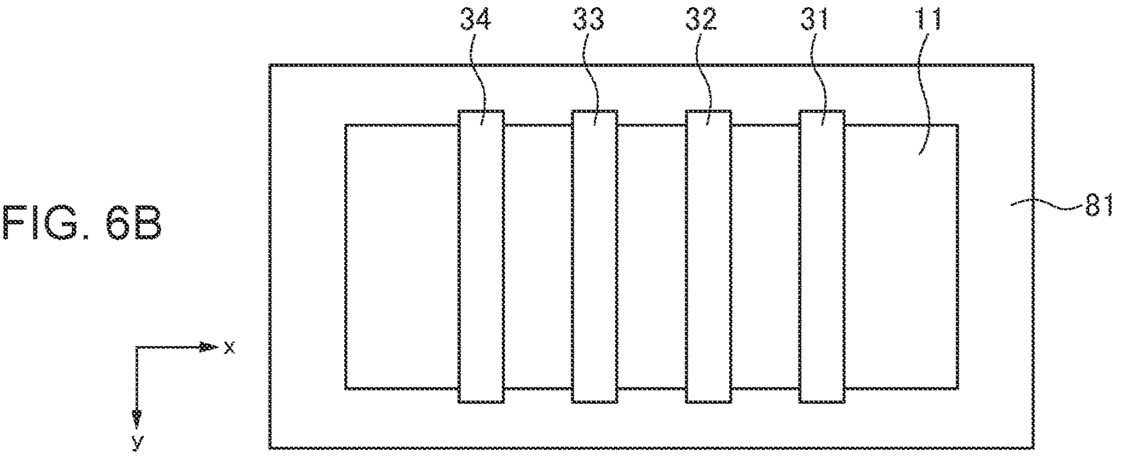
Figure 6C:
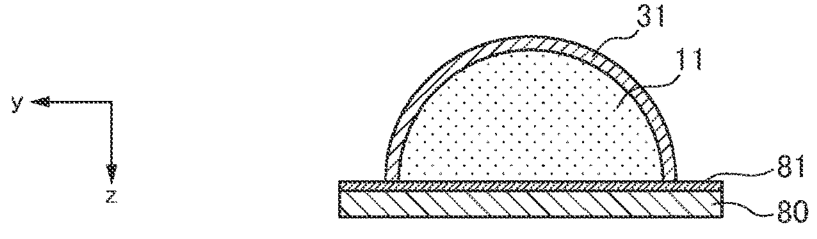

Then, as illustrated in FIGS. 6A to 6C, the first sections 31 to 34 are formed on the first surface 11*a* of the winding core area 11. The first sections 31 to 34 are formed as follows: forming a thin feeding film on the entire surface of the first surface 11*a* of the winding core area 11; applying a photosensitive resist using a spray method, followed by exposure and development, to form openings in the photosensitive resist; and growing the first sections 31 to 34 in the respective openings by electrolyte plating. As a result, the first sections 31 to 34 consecutively extending along the first surface 11*a* of the winding core area 11 are formed. Since the first surface 11*a* of the winding core area 11 has a curved surface in the circumferential direction and has no corners, breakage and film thickness variation are less likely to occur in the first sections 31 to 34.

Figure 7A:
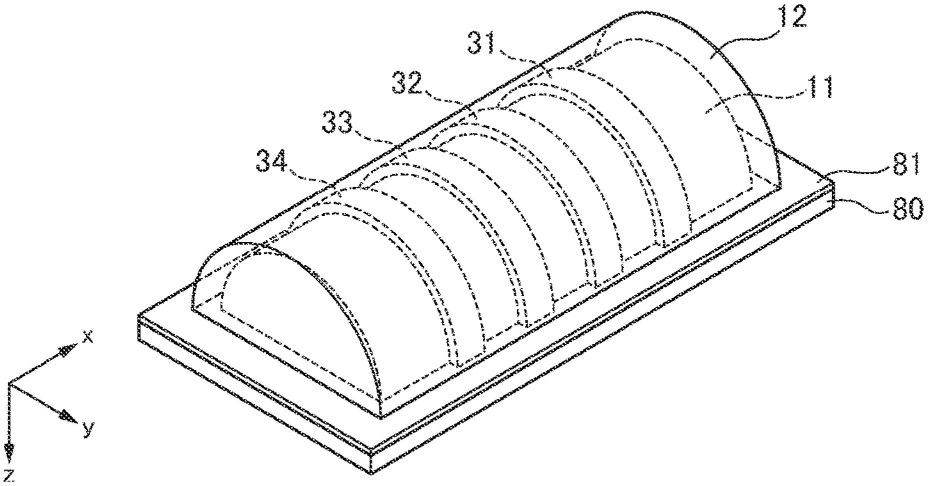
Figure 7B:
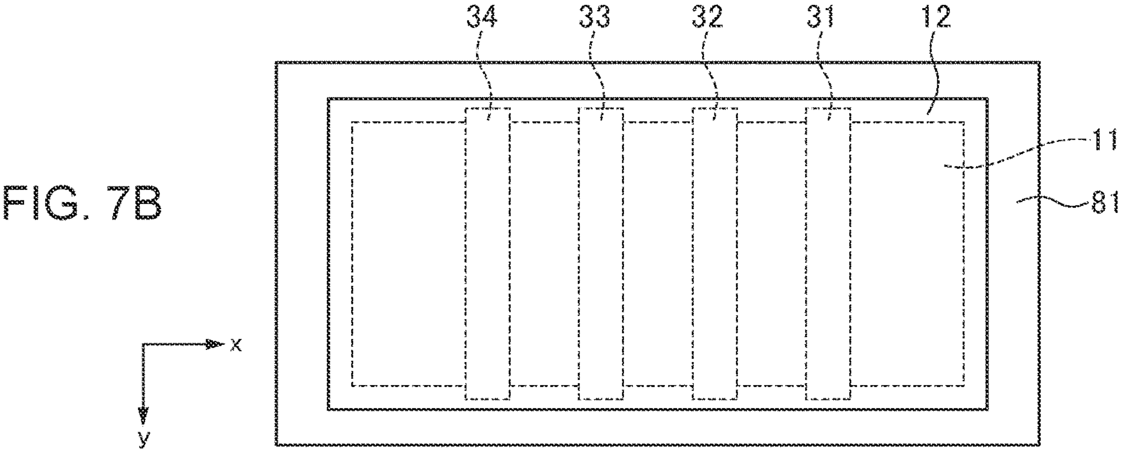
Figure 7C:
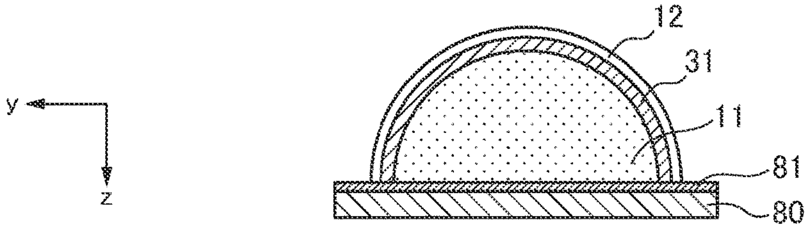
Figure 8A:
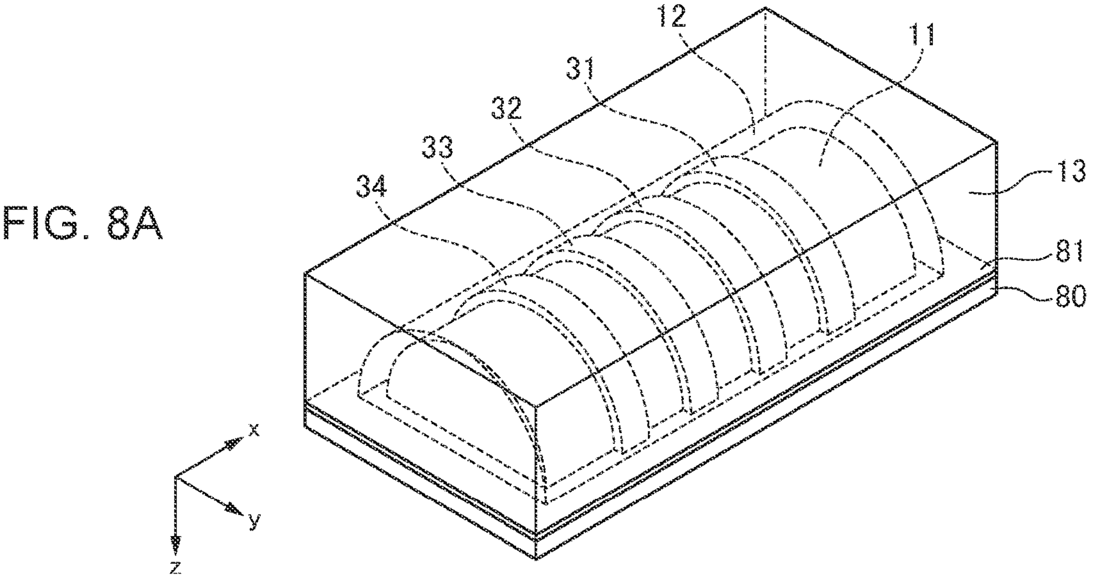
Figure 8B:
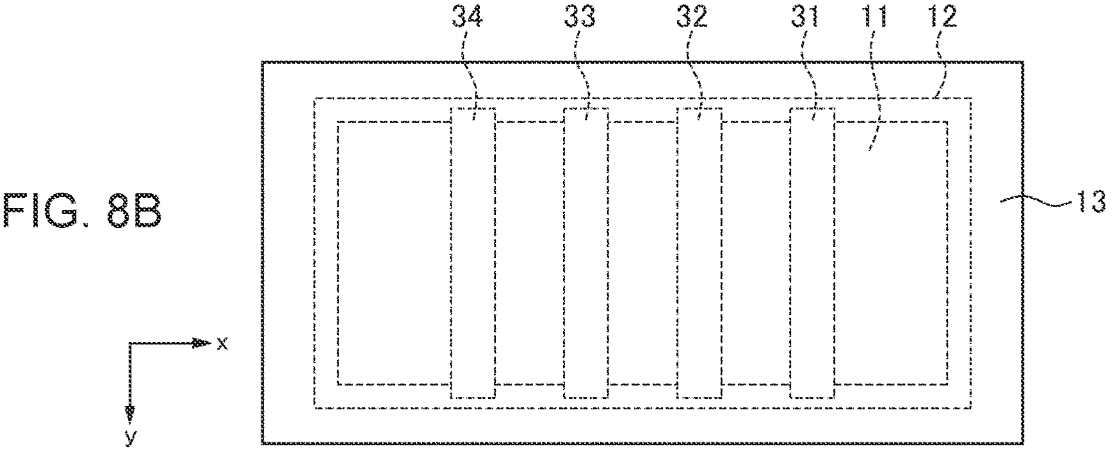
Figure 8C:
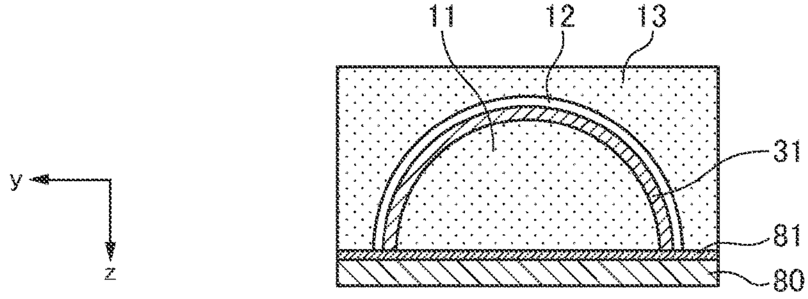

Then, as illustrated in FIGS. 7A to 7C, the surrounding area 12 is formed on the first surface 11*a* of the winding core area 11 so as to embed the first sections 31 to 34 therein. As a result, the first sections 31 to 34 adjacent to one another in the x-direction are insulated from one another by a resin-based insulating material having a low relative permittivity. The surrounding area 12 should have a film thickness which is sufficient for the spaces between the first sections 31 to 34 adjacent to one another in the x-direction to be filled with the surrounding area 12, but need not be any thicker. Thus, the surface of the surrounding area 12 reflects the shape of the first surface 11*a* of the winding core area 11 to have an arc shape. Then, as illustrated in FIGS. 8A to 8C, the surrounding area 13 covering the surrounding area 12 is formed, followed by flattening of the surface thereof. As a result, the first surface 11*a* of the winding core area 11 is covered with the surrounding area 13 having high strength through the first sections 31 to 34 and surrounding area 12. The film thickness of the surrounding area 13 needs to be large enough to flatten the xy surface. That is, the film thickness of the surrounding area 13 needs to be sufficiently larger than the sum of the heights of the winding core area 11 and surrounding area 12 in the z-direction.

Figure 9A:
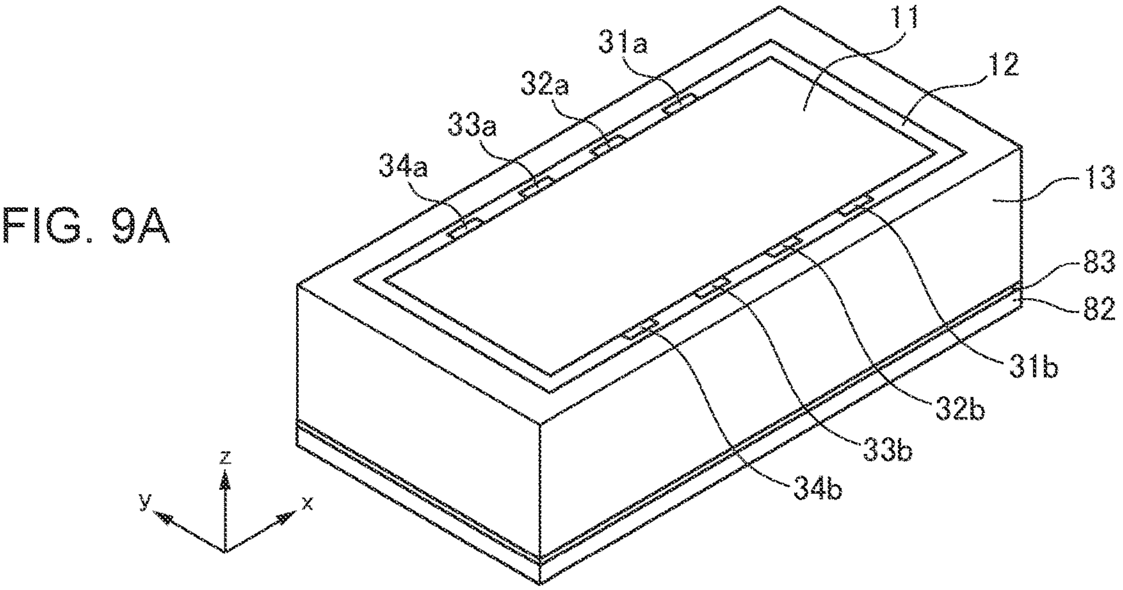
Figure 9B:
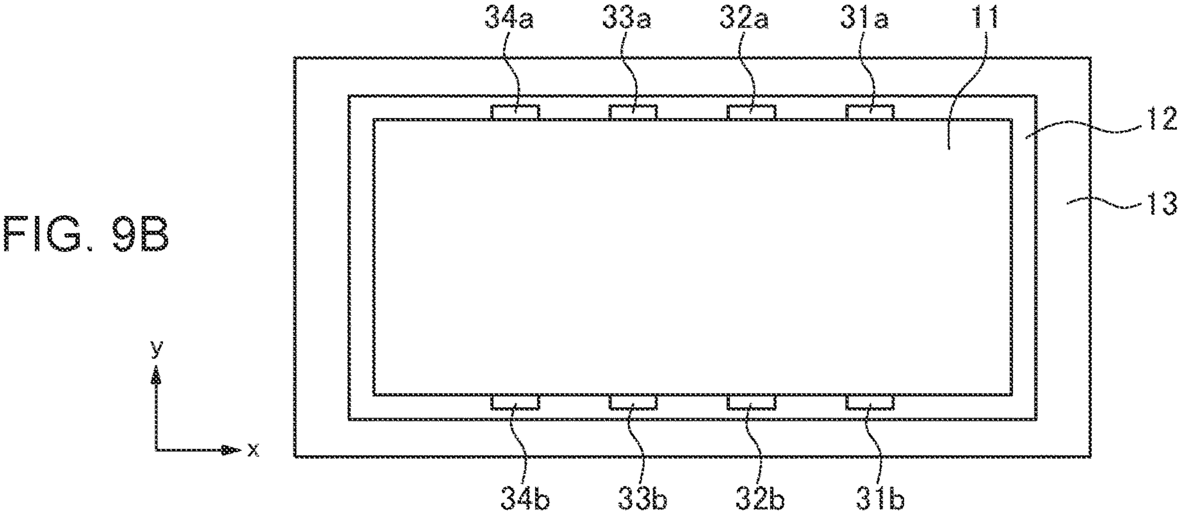
Figure 9C:
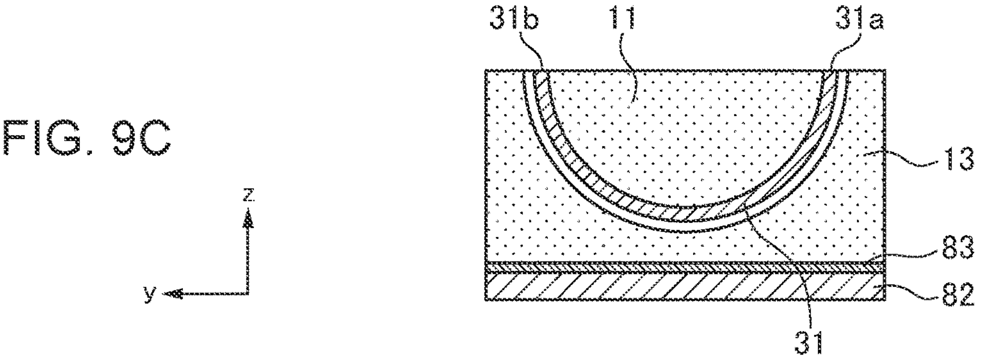

Then, as illustrated in FIGS. 9A to 9C, another support substrate 82 made of glass or silicon is bonded to the top surface of the flattened surrounding area 13 through a bonding layer 83, followed by removal of the support substrate 80 and sacrificial layer 81. As a result, the second surface 11*b* of the winding core area 11, and the one ends 31*a* to 34*a* and the other ends 31*b* to 34*b* of the first sections 31 to 34 are exposed.

Figure 10A:
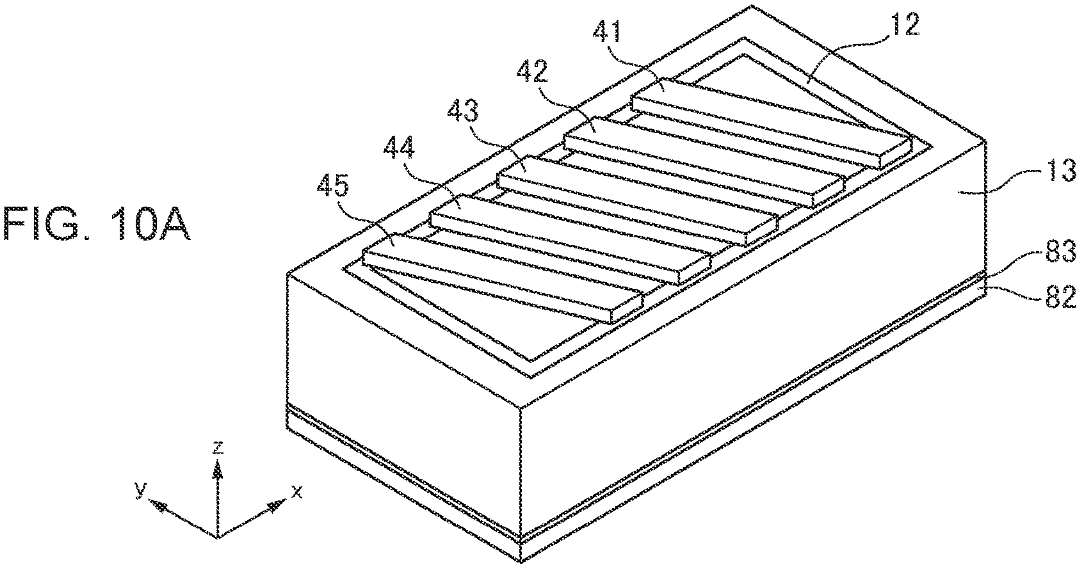
Figure 10B:
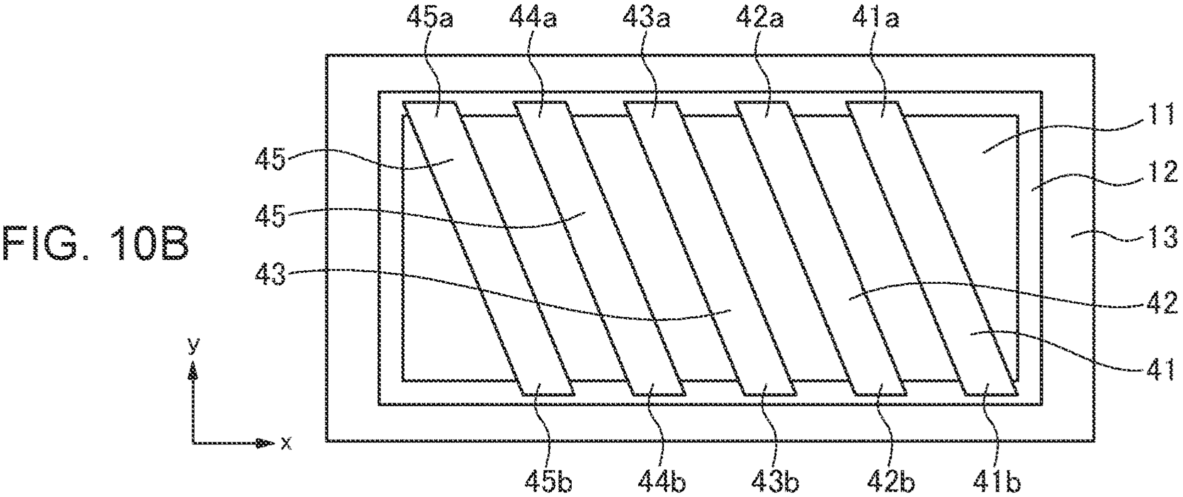
Figure 10C:
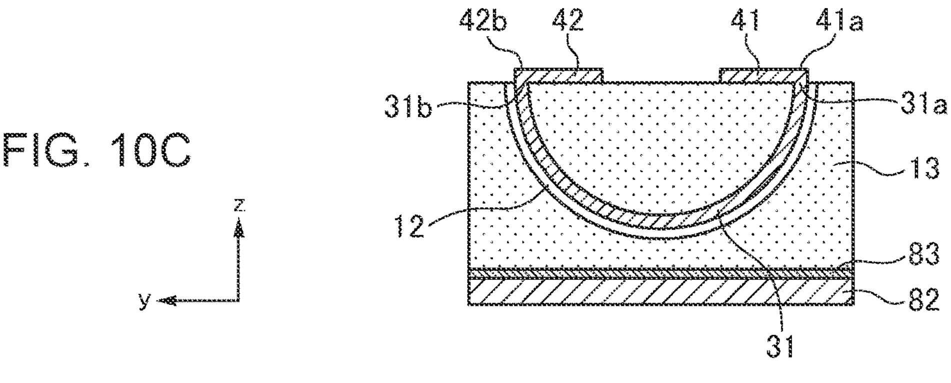

Then, as illustrated in FIGS. 10A to 10C, the second sections 41 to 45 are formed on the second surface 11*b* of the winding core area 11. The second sections 41 to 45 are formed as follows: forming a thin feeding film on the entire surface of the second surface 11*b*; bonding a photosensitive film, followed by exposure and development, to form openings in the photosensitive film; and growing the second sections 41 to 45 in the respective openings by electrolyte plating. As a result, the one ends 31*a* to 34*a* of the first sections 31 to 34 are connected respectively to the one ends 41*a* to 44*a* of the second sections 41 to 44, and the other ends 31*b* to 34*b* of the first sections 31 to 34 are connected respectively to the other ends 42*b* to 45*b* of the second sections 42 to 45. The above connection is made on the flat surface, and hence, high connection reliability can be ensured.

Figure 11A:
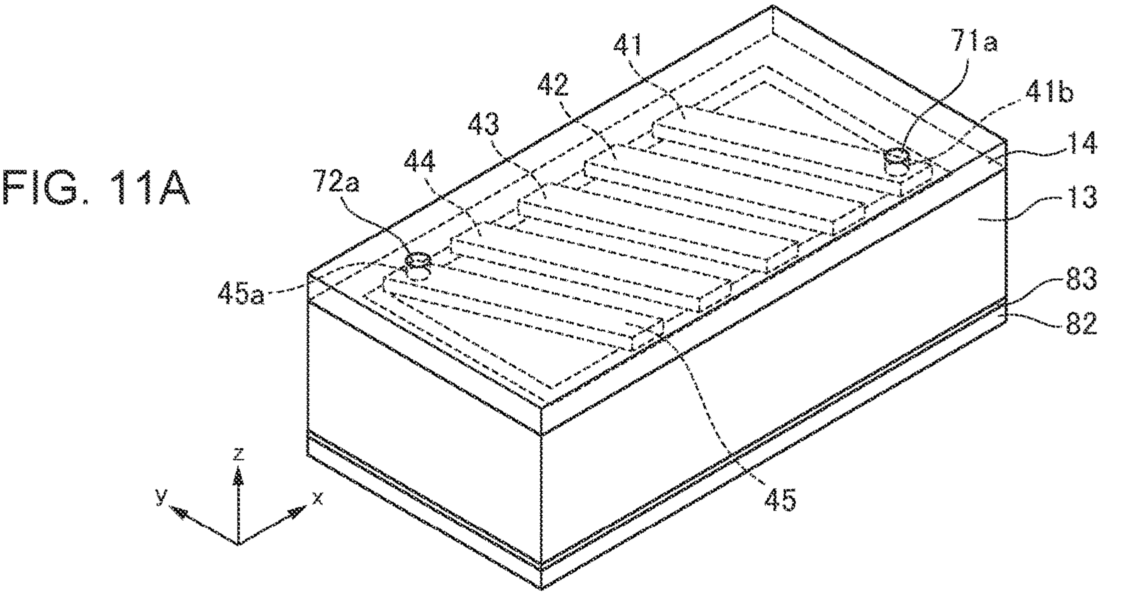
Figure 11B:
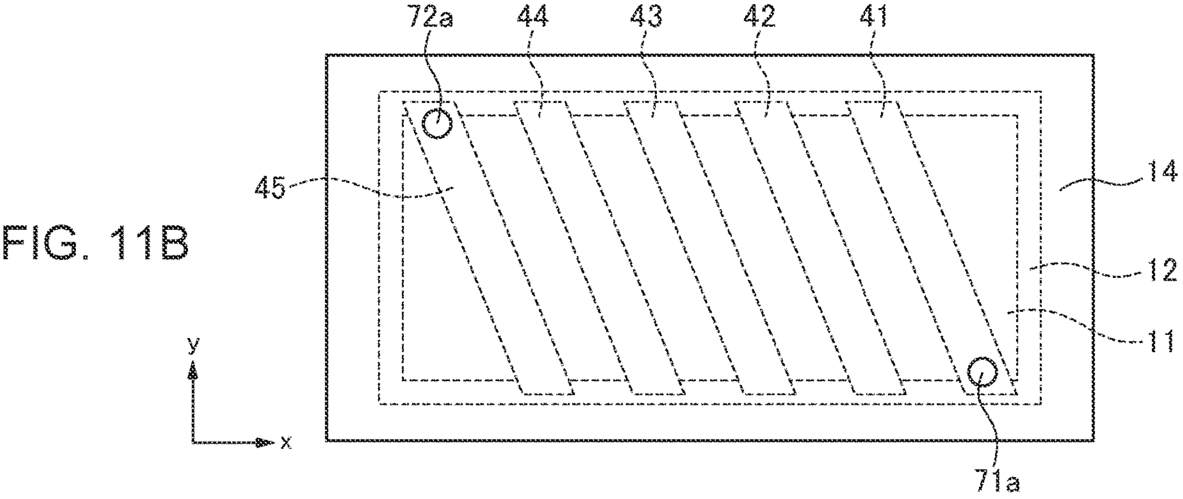
Figure 11C:
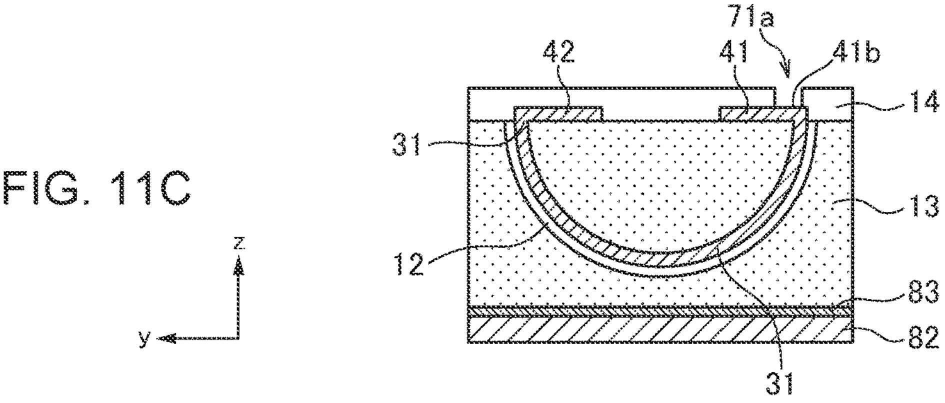

Then, as illustrated in FIGS. 11A to 11C, the surrounding area 14 is formed on the entire surface so as to embed the second sections 41 to 45 therein. Thus, the second sections 41 to 45 adjacent to one another in the x-direction are insulated from one another by a resin-based insulating material having a low relative permittivity. Then, openings 71*a* and 72*a* are formed in the surrounding area 14 to expose the other end 41*b* of the second section 41 and the one end 45*a* of the second section 45 therethrough. Finally, the terminal electrodes E1 and E2 are formed so as to overlap the openings 71*a* and 72*a*, respectively, and the support substrate 82 and bonding layer 83 are removed, whereby the coil component 1 according to the present embodiment is completed.

As described above, the manufacturing method for the coil component 1 according to the present embodiment includes: forming the first sections 31 to 34 on the first surface 11*a* of the winding core area 11; covering the first surface 11*a* of the winding core area 11 with the surrounding areas 12 and 13; removing the support substrate 80 to expose the second surface 11*b* of the winding core area 11; and forming the second sections 41 to 45 on the second surface 11*b* of the winding core area 11, thereby allowing the formation of the coil pattern C having two connection points per turn.

Second Embodiment

Figure 12:
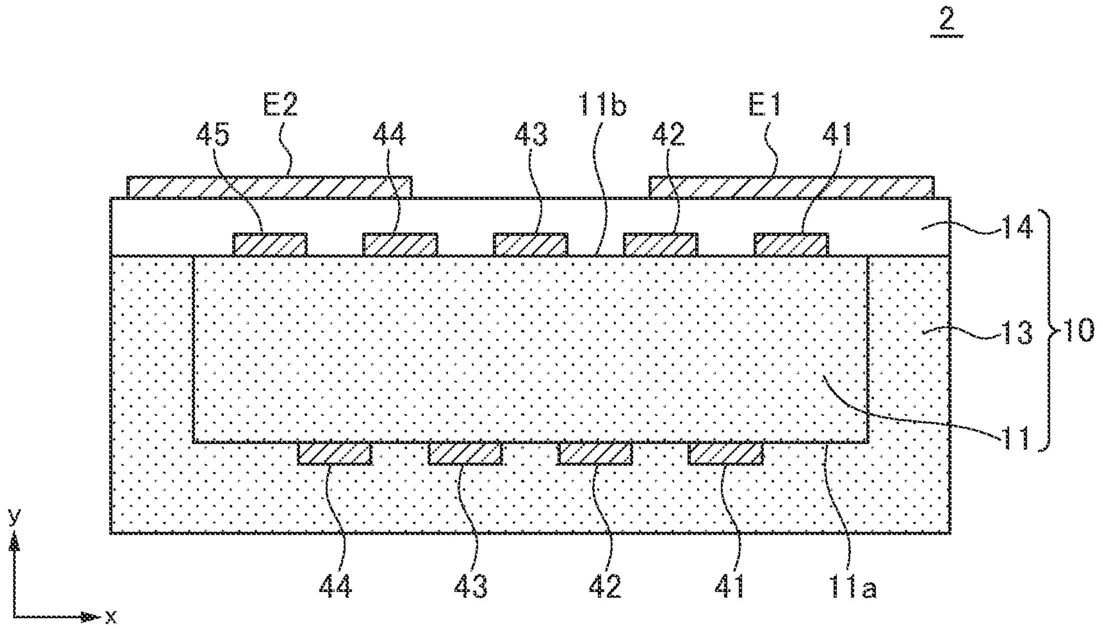
FIG. 12 is a schematic cross-sectional view for explaining the configuration of a coil component 2 according to a second embodiment of the present embodiment.

FIG. 12 is a schematic cross-sectional view for explaining the configuration of a coil component 2 according to a second embodiment of the present embodiment.

As illustrated in FIG. 12, the coil component 2 according to the second embodiment differs from the coil component 1 according to the first embodiment in that the surrounding area 12 is omitted. Other basic configurations are the same as those of the coil component 1 according to the first embodiment, so the same reference numerals are given to the same elements, and overlapping description will be omitted. As exemplified by the coil component 2 according to the second embodiment, the first sections 31 to 34 need not necessarily be covered with a resin-based insulating material having a low relative permittivity in the present invention.

Third Embodiment

Figure 13:
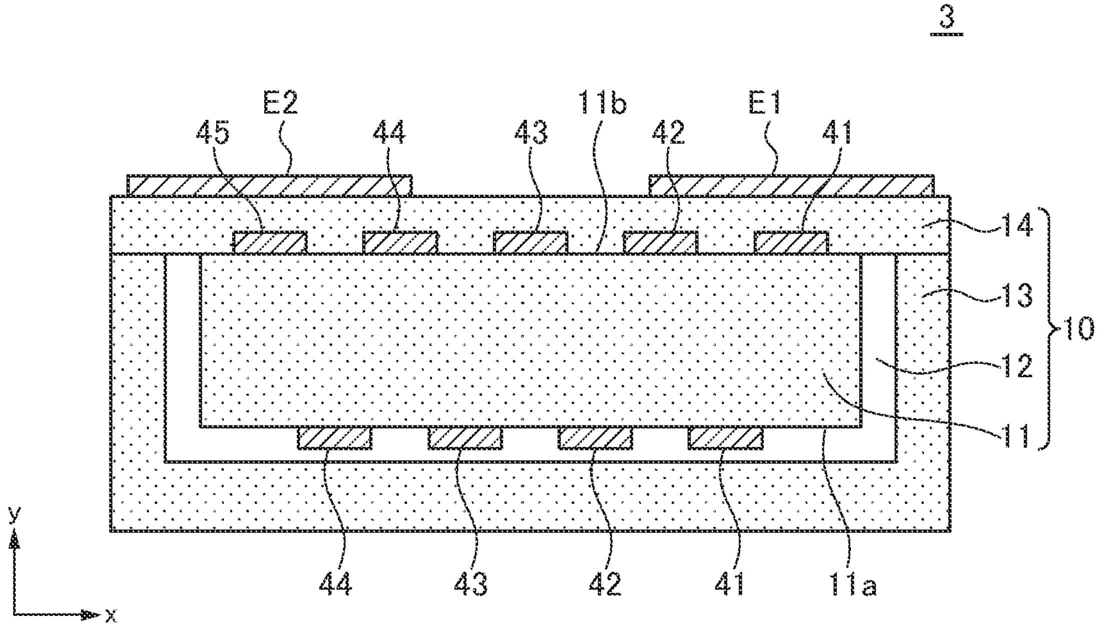
FIG. 13 is a schematic cross-sectional view for explaining the configuration of a coil component 3 according to a third embodiment of the present invention.

FIG. 13 is a schematic cross-sectional view for explaining the configuration of a coil component 3 according to a third embodiment of the present invention.

As illustrated in FIG. 13, the coil component 3 according to the third embodiment differs from the coil component 1 according to the first embodiment in that the surrounding area 14 is made of the same resin-based insulating material as that of the surrounding area 13. Other basic configurations are the same as those of the coil component 1 according to the first embodiment, so the same reference numerals are given to the same elements, and overlapping description will be omitted. As exemplified by the coil component 3 according to the third embodiment, the second sections 41 to 44 need not necessarily be covered with a resin-based insulating material having a low relative permittivity in the present invention.

It is apparent that the present disclosure is not limited to the above embodiments, but may be modified and changed without departing from the scope and spirit of the disclosure.

What is claimed is:

1. A coil component comprising:

a resin body;

a coil pattern embedded in the resin body and helically wound in a plurality of turns; and first and second terminal electrodes provided on a surface of the resin body and connected respectively to one and other ends of the coil pattern, wherein the resin body includes:

a winding core area surrounded by the coil pattern and having a first surface and a substantially flat second surface different in the circumferential direction position from the first surface; and a first surrounding area covering the first surface of the winding core area, wherein the coil pattern includes a plurality of first sections extending along the first surface of the winding core area and a plurality of second sections extending along the second surface of the winding core area, wherein one ends of the plurality of first sections are connected respectively to their corresponding one ends of the plurality of second sections, and wherein other ends of the plurality of first sections are connected respectively to their corresponding other ends of the plurality of second sections.

2. The coil component as claimed in claim 1, wherein the first surface of the winding core area has a curved surface in a circumferential direction.

3. The coil component as claimed in claim 1, wherein the winding core area and the first surrounding area are made of mutually different resin-based insulating materials.

4. The coil component as claimed in claim 3, wherein the first surrounding area is added with filler, and wherein the winding core area is not added with filler.

5. The coil component as claimed in claim 1, wherein the resin body further includes a second surrounding area that covers the second surface of the winding core area so as to embed the plurality of second sections therein, wherein the first and second terminal electrodes are provided on the second surrounding area, and wherein a resin-based insulating material constituting the second surrounding area is lower in relative permittivity than a resin-based insulating material constituting the first surrounding area.

6. The coil component as claimed in claim 1, wherein the resin body further includes a third surrounding area provided between the first surface of the winding core area and the first surrounding area so as to embed the plurality of first sections therein, and wherein a resin-based insulating material constituting the third surrounding area is lower in relative permittivity than a resin-based insulating material constituting the first surrounding area.

7. The coil component as claimed in claim 1, wherein the first and second terminal electrodes are arranged along an axial direction of the coil pattern.

8. The coil component as claimed in claim 7, wherein the first and second terminal electrodes are formed on the surface of the resin body parallel to the axial direction without being formed on another surface thereof perpendicular to the axial direction.

9. A method of manufacturing a coil component, the method comprising:

forming a winding core area made of a resin-based insulating material on a support body;

forming a plurality of first sections of a coil pattern along a first surface of the winding core area;

covering the plurality of first sections and the first surface of the winding core area with a first surrounding area made of a resin-based insulating material;

exposing a second surface of the winding core area and one and other ends of each of the plurality of first sections by removing the support body; and forming a plurality of second sections of the coil pattern so as to connect the one ends of the plurality of first sections and their corresponding other ends of the plurality of first sections.

10. The method of manufacturing a coil component as claimed in claim 9, further comprising:

forming, on the second surface of the winding core area, a second peripheral area made of a resin-based insulating material so as to embed the plurality of second sections therein; and forming, on the second surrounding area, first and second terminal electrodes connected respectively to one and other ends of the coil pattern, wherein the resin-based insulating material constituting the second surrounding area is lower in relative permittivity than the resin-based insulating material constituting the first surrounding area.

11. The method of manufacturing a coil component as claimed in claim 9, further comprising forming, on the first surface of the winding core area, a third surrounding area made of a resin-based insulating material so as to embed the plurality of first sections therein after the forming the plurality of first sections of the coil pattern and before the covering, wherein the resin-based insulating material constituting the third surrounding area is lower in relative permittivity than the resin-based insulating material constituting the first surrounding area.

* * * * *